Feb. 28, 1950  R. A. ARTHUR  2,498,633
DIFFERENTIAL AND RATIO CONTROL
Filed March 2, 1946

*INVENTOR.*
ROBERT A. ARTHUR
BY
ATTORNEY

Patented Feb. 28, 1950

2,498,633

UNITED STATES PATENT OFFICE 2,498,633

DIFFERENTIAL AND RATIO CONTROL

Robert A. Arthur, Santa Monica, Calif., assignor to The Garrett Corporation, Los Angeles, Calif., a corporation of California Application March 2, 1946, Serial No. 651,605

18 Claims. (Cl. 98—1.5)

This invention relates to apparatus for controlling the ventilation, under pressure, of the atmosphere within an enclosure such as an aircraft cabin. It deals particularly with apparatus for controlling cabin pressure in such as manner as to maintain a ratio between cabin and atmospheric pressure in the upper flight altitudes.

A commonly used cabin pressurization system is one in which cabin pressure is permitted to remain substantially the same as atmospheric pressure until a predetermined altitude has been reached, then there is maintained a substantially constant cabin pressure between that altitude and a second predetermined and higher altitude, and, above such second predetermined altitude, there is maintained a substantially fixed differential relative to external atmosphere. In the isobaric range of operation of such a system, wherein cabin pressure is maintained constant, there will be a fairly rapid increase in the ratio between cabin pressure and atmospheric pressure; in the differential range of operation, wherein a fixed differential between cabin pressure and atmospheric pressure is maintained, the ratio between cabin and atmospheric pressure will continue to increase. It may be desirable to limit this increase in pressure ratio in order to avoid an unfavorable effect upon supercharger operation which becomes manifest at the higher ratios, since superchargers properly are constant ratio devices, and a surging of the airflow would result if the ratio of cabin pressure to atmospheric pressure were to exceed the pressure ratio capacity of the supercharger.

It is particularly desirable to limit the pressure ratio in military aircraft, in order to avoid the injurious effect on the human body of explosive decompression which results from a sudden release of pressure from within a cabin which has been badly ruptured in combat. In explosive decompression, assuming a perforation or rupture of a given maximum size in the cabin wall, the volume of the cabin determines the maximum safe ratio between the pressures of air in the human body before and after explosive decompression. The pressure of air in the human body before explosive decompression equals cabin pressure minus the partial pressure of water vapor in the human body at body temperature, which equals 1.85 inches of mercury. The pressure of air in the human body after explosive decompression equals atmospheric pressure minus said partial pressure of water vapor in the human body at body temperature. If the said maximum safe ratio between the pressures of air in the human body before and after explosive decompression is not to be exceeded, then at high altitudes the ratio between cabin and atmospheric pressures must decrease as the aircraft ascends.

With the foregoing problems in mind, the invention has as a general object to provide a pressure regulating system adapted to permit the ratio between cabin and atmospheric pressures to gradually increase up to a predetermined limit and to prevent the ratio exceeding that limit. More specifically, and in connection with the use of the invention in military aircraft, the invention aims to provide a pressure regulating system adapted to permit the pressure ratio to gradually increase up to a predetermined limit and to then cause said ratio to gradually decrease as the plane attains higher altitude.

For a puncture of a given area, the rate of decompression in a small airplane such as a fighter will be much more rapid than the rate of decompression of a large airplane such as a long range bomber. Because the decompression rate of a large airplane is lower, it is not necessary to restrict the pressure ratio to as low a figure in a large airplane as in a small one.

The decrease in pressure above the altitude at which the maximum safe ratio is reached for military operations should be brought about in a manner which will maintain a substantially constant ratio between cabin and atmospheric pressure values, each diminished by a constant. The most desirable ratio is one in which the value of its constant is 1.85 (the vapor pressure in inches of mercury within the human lung at body temperature). The greatest protection at maximum safe pressure against the injurious effect of explosive decompression can be attained where a constant value is maintained for the ratio of $(C-1.85)/(A-1.85)$, where C represents cabin pressure and A represents atmospheric pressure, both expressed in inches of mercury. Accordingly, another object of the invention is to provide a pressure control system adapted to maintain a substantially constant ratio between cabin pressure minus 1.85 and atmospheric pressure minus 1.85, or between cabin and atmospheric pressures, each diminished by any selected constant, which may be zero.

A further object of the invention is to provide a pressure control system embodying a ratio control wich is adapted to override a previously operative control such as a differential pressure control.

Another object is to provide a pressure control system embodying a differential pressure control and a pressure ratio control, both embodied in a single control unit employing common mechanism for both control functions.

Another object of the invention is to provide a pressure ratio control unit which may be incorporated in a conventional type of regulator without requiring any substantial change in design in other parts of the regulator.

A further object of the invention is to provide a pressure control system embodying isobaric, differential, and ratio controls, and yet of extremely simple and inexpensive construction.

Further objects and advantages of the invention will be brought out in the following part of the specification.

Referring to the drawing which is for illustrative purposes only,

Figure 1:
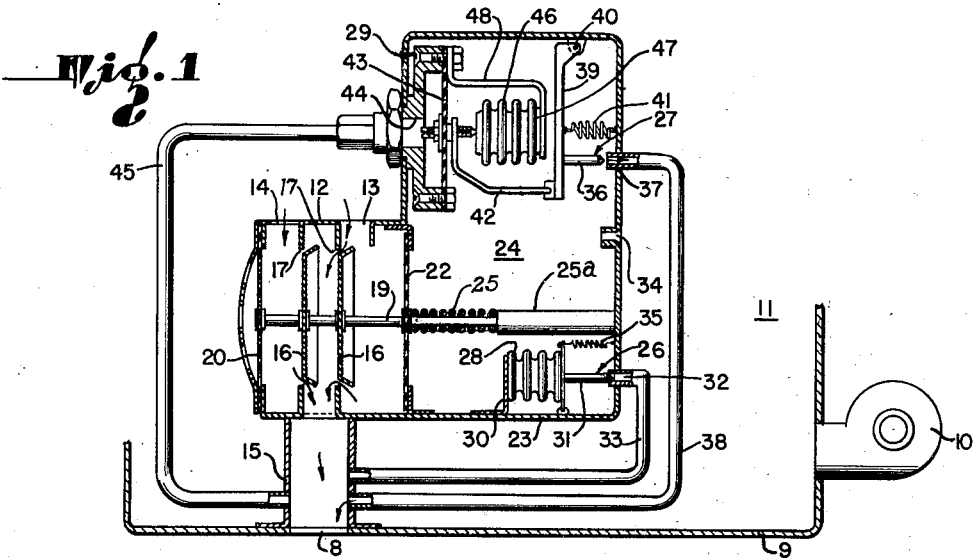
Fig. 1 is a schematic representation of a pressure regulator embodying the invention.

As an example of a system embodying the invention, I have shown in the drawing a regulator adapted to control the outflow through an outlet 8 in the wall 9 of an aircraft cabin, of air which is pumped into the cabin under pressure by suitable supercharging apparatus 10 or by an air ram or scoop facing into the slip stream or relative wind. The regulator is adapted to be disposed within the cabin 11 and embodies generally a valve casing 12 into which cabin air flows through openings 13 and 14. The regulator has an outlet duct 15 for discharging such air through the cabin outlet 8, a pair of valve elements 16 controlling valve apertures 17, through which the air may flow from the valve casing 12 through the duct 15, and cabin outlet 8 to atmosphere. The valves 16 are carried by a shaft 19 which is supported between an axially flexible support member 20 and a diaphragm 22. The diaphragm 22 is clamped to one end of the casing 12 by a casing section 23 which cooperates therewith to define a control chamber 24 in which is maintained a pressure normally a trifle lower than the pressure in the cabin. The diaphragm 22 responds to differentials arising between cabin pressure which is exerted against its left side (as viewed in Fig. 1) and the pressure of the air in the control chamber 24, supplemented by the pressure of a compression spring 25, exerted against its right side and reacting against an abutment member 25a which may also serve as a guide for shaft 19. Any tendency of cabin pressure to drop below the level determined by the pressure in the control chamber 24 will result in movement of the diaphragm 22 in valve closing direction, thus causing cabin pressure to rise to the proper level. Conversely, any excess of cabin pressure will result in valve opening movement, permitting cabin pressure to drop back to the level determined by the pressure in the control chamber 24.

The pressure in the chamber 24 is controlled by pilot valves 26 and 27 which are adapted to bleed excess pressure from the chamber 24 in accordance with the response of an evacuated isobaric bellows or aneroid 28 and the pressure responsive mechanism of the combined differential and ratio control unit 29.

The isobaric aneroid 28 comprises an evacuated and sealed bellows which is responsive to the absolute pressure existing in the chamber 24. One end of the bellows 28 is anchored to the casing 23, as indicated at 30, and the other end is free to move axially and controls the movement of a metering pin 31 which is cooperable with an outlet 32 connected through a tube 33 to the duct 15, and thus is in communication with substantially atmospheric pressure.

Air from the cabin 11, which is normally at a slightly higher pressure than the pressure in the control chamber 24, bleeds into the chamber 24 through an aperture 34 in the casing 23. Whenever the pressure in the chamber 24 tends to exceed the pressure at which the pilot valve 26 is set to open (in accordance with the adjustment of a spring 35 which acts in valve closing direction), the increase in pressure will collapse the isobaric aneroid 28 against the resistance of the spring 35, move the metering pin 31 away from the outlet 32, and permit the excess pressure to bleed off through the tube 33. In the initial or unpressurized stage of operation (for example below altitudes of 8,000 feet) the valve 26 will remain open, valve 27 closed and valve 16 open, permitting the pressure in the chamber 24 to remain substantially equalized with atmospheric pressure, and maintaining only a small differenital between cabin and atmospheric pressure while both pressures diminish in equal amounts as the airplane ascends.

In a second or isobaric stage of operation—for example, between altitudes of 8,000 feet and 20,000 feet—the valve 27 remains closed and valve 26 open just enough to maintain a small differential between cabin pressure and that in chamber 24, said pressures remaining at relatively constant absolute values. As the airplane ascends, atmospheric pressure decreases, therefore the differential between cabin pressure and atmospheric pressure will increase.

In a third stage of operation, differential control becomes effective, the valve 26 remaining closed. This differential control is effected through the control unit 29, which comprises a metering pin 36 cooperating with an opening 37 to constitute the valve 27, a tube 38 between the opening 37 and the throat 15, a lever 39 pivoted to the casing 23 at 40 and controlling the movement of the metering pin 36, a spring 41 urging the lever 39 in valve-closing direction, and the pressure responsive mechanism which will be now described.

Connected to the end of the lever 39 opposite the pivot 40 is one end of a link 42, the other end of which is attached to the center of a diaphragm 43. The diaphragm 43 is clamped to a coupling 44 which is connected through a tube 45 to the throat 15 and thus to atmosphere. Thus the outer side of the diaphragm 43 is subjected to substantially atmospheric pressure, while the inner side is subjected to the pressure within the chamber 24. Consequently, the diaphragm 43 is adapted to respond to the differential between atmospheric pressure and the pressure within the chamber 24, and thereby to operate the valve 27 in a manner to maintain within the cabin a pressure bearing a substantially fixed differential to atmospheric pressure.

Differential operation becomes effective when the upper limit of the isobaric (constant cabin pressure) range is reached. Throughout this isobaric range the differential between cabin and atmospheric pressure will constantly increase as a result of maintaining cabin pressure constant while atmospheric pressure continues to decrease. This increase in pressure differential is terminated at the end of the isobaric range and the beginning of the differential range by the opening of the valve 27 when the constantly decreasing pressure on the outer side of the diaphragm 43 has dropped to a sufficiently low value to permit the pressure in the chamber 24 against the inner side of the diaphragm 43 to overcome the pull of the spring 41. Throughout the differential range, the valve 27 will move toward the open position whenever the differential between cabin pressure and the pressure in chamber 24 tends to rise above the predetermined value, and to move toward the closed position whenever the said pressure differential tends to drop below such predetermined value. Thus the controlled pressure within the chamber 24 acts upon diaphragm 22 in a manner to open or close the valves 16 and maintain a constant pressure differential between the cabin and atmosphere.

The fourth stage of operation or ratio control is provided for by an evacuated bellows 46 having a base 47 mounted upon a bracket 48 suitably anchored in a fixed position, for example— upon the coupling 44. A compression spring 49 is engaged within the bellows 46 between its base 47 and its movable head 50. As the pressure within the chamber 24 decreases, the bellows 46 will continue to expand under the force of the spring 49 until the head 50 engages an adjusting screw 51 mounted in the center of the diaphragm 43. When such contact is made, the control 29 ceases to function as a differential control and becomes a ratio control.

Figure 2:
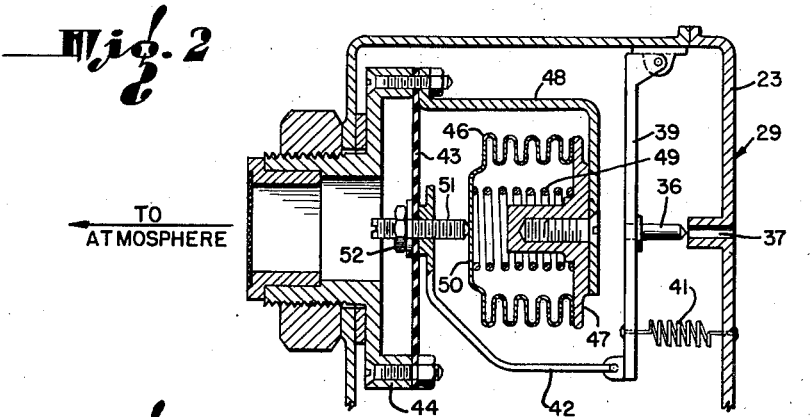
Fig. 2 is an enlarged sectional view of the combined differential and ratio control unit with the parts in ratio-controlling positions.
Figure 3:
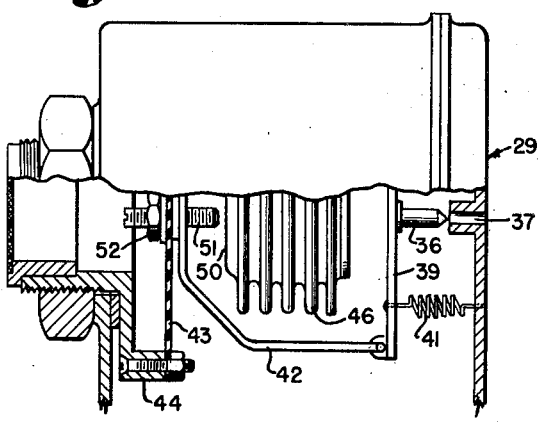
Fig. 3 is a partial sectional view of the control unit in the differential-controlling position of the parts.

In the ratio control range, the total force acting to move the diaphragm 43 inwardly or to the right, as viewed in Fig. 2, is the sum of the force resulting from atmospheric pressure acting against the total effective area of the diaphragm 43 and the force exerted by the spring 41. The total force acting to move the diaphragm 43 in the opposite direction is the sum of the force resulting from the pressure in the chamber 24 acting against a partial area of the diaphragm 43 equal to the total effective area of the diaphragm 43 minus the effective area of the bellows head 50, plus the spring force exerted by the spring 49 and the inherent spring of bellows 46.

The said two oppositely directed total forces must balance each other. It is clearly apparent from the fact that the air pressure is exerted equally against the head 50 and an equal area of the diaphragm 43 that the pressures against these areas will balance each other.

Expressed mathematically, the force on the inner side of the diaphragm 43 is equal to $C(D-B)+S'$ where C represents the air pressure within the control chamber 24; D represents the effective area of the diaphragm 43; B represents the effective area of the head 50 of the bellows 46; and S' represents the net combined spring force of the spring 49 and bellows 46. This total force is balanced against the force on the outer side of the diaphragm 43, which may be mathematically expressed as $AD+S$, where A represents the pressure of atmosphere and S represents the pull of the spring 41, acting through the arm 39.

The balancing of the forces on the opposite sides of the diaphragm 43 may be represented mathematically by the equation:

$$AD+S=C(D-B)+S'$$

If the beforementioned maximum safe military ratio is to be maintained, the force of the spring 49 and the bellows 46 must be greater than the pull of the spring 41. This difference in spring force divided by the effective area of the head 50 of the bellows 46 or $$\frac{S'-S}{B}$$

is substantially a constant and may be represented by K. The equation may be solved for C as follows:

$$AD+S=C(D-B)+S'$$

Transposing, $$AD=C(D-B)+S'-S$$

Dividing by $B(D-B)$ $$\frac{AD}{B(D-B)}=\frac{C}{B}+\frac{S'-S}{B(D-B)}$$

Substituting $$K=\frac{S'-S}{B}$$

$$\frac{AD}{B(D-B)}=\frac{C}{B}+\frac{K}{D-B}$$

$$\frac{AD}{D-B}=C+\frac{KB}{D-B}$$

$$C=\frac{AD-KB}{D-B}$$

The values of diaphragm area and effective bellows end area are of course known constants. The relation between the areas of the outer and inner sides of the diaphragm 43 against which air pressure is effective may be taken as a ratio which is an important factor in determining the ratios at which cabin pressures will be controlled. The relationship between the two areas may be expressed as $$R'=\frac{D}{D-B}$$

Substituting R' for $$\frac{D}{D-B}$$

in the above stated equation for control chamber pressure gives the following equation:

$$C=AR'-\frac{KB}{D-B}$$

Solving the equation $$C=\frac{AD-KB}{D-B} \text{ for } \frac{D}{D-B}$$

we have:

$$C-K=\frac{AD-KB}{D-B}-K$$

$$C-K=\frac{AD-KB}{D-B}-\frac{K(D-B)}{D-B}$$

$$C-K=\frac{AD-KB-KD+KB}{D-B}$$

$$C-K=\frac{AD-KD}{D-B}=\frac{(A-K)D}{D-B}$$

$$\frac{D}{D-B}=\frac{C-K}{A-K}$$

$$R'=\frac{D}{D-B}=\frac{C-K}{A-K}$$

So throughout the entire ratio control range the ratio $$\frac{C-K}{A-K}$$

will be equal to the constant value $R'$.

If we ignore the relatively very slight differential between cabin pressure and the control pressure in chamber 24 and arbitrarily call them equal, then all the above equations concerning the control pressure C, are also true for cabin pressure. The relative error resulting from this assumption is negligible in the contemplated range of operation of the ratio control.

On the basis of the above assumption, the equation for the ratio between cabin and atmospheric pressure may be derived by dividing both sides of the above stated equation by A and is as follows:

$$\frac{C}{A}=R'-\frac{KB}{A(D-B)}$$

or $$R=R'-\frac{KB}{A(D-B)}$$

using the term R to designate the ratio $C/A$.

From the last stated equation, it will be apparent that if the value of K is zero, the equation is reduced to $R=R'$, i. e., the ratio between cabin and atmospheric pressure is the same as the ratio $R'$ of effective diaphragm areas. It will be also apparent from the equation that as the value of A (atmospheric pressure) decreases with increasing altitude, the value of the fraction $$\frac{KB}{A(D-B)}$$

will increase if K is a finite positive quantity, and the value of $R'$ minus this fraction will correspondingly decrease. Consequently, the ratio between cabin and atmospheric pressures will be caused to decrease with increasing altitudes when K has a positive value. Thus the invention meets the need for a control system which will decrease the ratio with increasing altitude, which need is brought about by the fact that the ratio at which the human body can safely stand explosive decompression decreases with increasing altitudes. By providing for decreasing ratio, it is possible to adjust the ratio to its maximum limit consistent with safety to the occupants of the plane, for all altitudes above the level where the ratio control becomes operative.

When the value of K is 1.85, the ratio R will be at a maximum consistent with safety for all altitudes within the ratio control range. This may be termed as the "expansion" ratio, and is a value desired for military purposes. Also, where K equals 0 the ratio R will be at a maximum consistent with the performance of the superchargers for commercial operation.

The adjustability of screw 51 permits setting the mechanism to maintain whatever ratio may be desirable in a particular case.

I claim as my invention:

1. Mechanism for regulating the pressure in an aircraft cabin, comprising: a valve for controlling the flow of cabin air in a manner to control the pressure in the cabin; a servomotor for operating the valve, said servomotor including a pressure responsive element connected to the valve and means cooperating with one side of said pressure responsive element to define a chamber in which a control pressure C is maintained; and means for controlling the pressure in said control chamber, comprising a pilot valve for bleeding off excess pressure from said control chamber and control means for said pilot valve including a pressure responsive member subjected on one side to substantially atmospheric pressure A effective against an area D and subjected on its other side to control chamber pressure effective against a smaller area D—B, means exerting a constant force K against said pressure responsive member in opposition to the pressure of atmosphere thereagainst, and means for transmitting the forces resulting from said several pressures and said constant force to said pilot valve in a manner to maintain a ratio between cabin and atmospheric pressures substantially in accordance with the equation $$\frac{C-K}{A-K}=\frac{D}{D-B}$$

2. Mechanism for controlling the pressure in an aircraft cabin, comprising: a valve for regulating the flow of cabin air so as to regulate the pressure within the cabin; a servomotor for operating the valve, said servomotor including a pressure responsive element and means cooperating with one side of said pressure responsive element to define a control chamber in which a control pressure is maintained; means for regulating said control pressure, including a pilot valve for bleeding excess pressure therefrom and control means for said pilot valve including a diaphragm exposed on one side to substantially atmospheric pressure and on its other side to control chamber pressure, an evacuated bellows operative to reduce the area of said diaphragm against which control chamber pressure is effective, means for opposing a substantially constant force to the pressure of atmosphere against said diaphragm; and means for transmitting the net effect of said several pressures and said force to said pilot valve.

3. Control mechanism as defined in claim 2, wherein said pressures and said force are so related as to cause cabin pressure to maintain a decreasing ratio to atmospheric pressure with increasing altitudes.

4. Mechanism for controlling the pressure in an aircraft cabin, comprising: a valve for regulating the flow of cabin air so as to regulate the pressure within the cabin; a servomotor for operating the valve, said servomotor including a pressure responsive element and means cooperating with one side of said pressure responsive element to define a control chamber in which a control pressure is maintained; means for regulating said control pressure including a pilot valve for bleeding excess pressure therefrom and control means for said pilot valve including a diaphragm exposed on one side to substantially atmospheric pressure and on its other side to control chamber pressure, an evacuated bellows exteriorly subject to control chamber pressure and cooperable with said diaphragm to reduce the effective area of the diaphragm against which control chamber pressure is effective; a spring exerting a force adapted to oppose the atmospheric pressure against said diaphragm; a second spring exerting a force in the direction of action of atmospheric pressure against said diaphragm; and lever mechanism for transmitting the net effect of said springs and of the pressures against said diaphragm to said pilot valve in a manner to cause the ratio between cabin pressure minus a constant (which may be zero) and atmospheric pressure minus said constant to have a substantially constant and predetermined value for all altitudes within the ratio-control range of operation.

5. A pressure regulator for an aircraft cabin, comprising: a valve for regulating the flow of cabin air and thereby regulating the pressure within the cabin; a servomotor for operating the valve, said servomotor including a pressure responsive element and means cooperating with one side thereof to define a control chamber in which control pressure is maintained; and means for controlling the pressure in said control chamber, including a pilot valve for bleeding excess pressure therefrom, and a combined differential and ratio control unit for said pilot valve including a pressure responsive member exposed on one side to substantially atmospheric pressure and on its other side to control chamber pressure, linkage connecting said pressure responsive member to said pilot valve, spring means acting against said linkage in a direction of action of atmospheric pressure, an evacuated bellows adapted, when control chamber pressure has decreased to a predetermined point, to establish contact with said pressure responsive member and thereupon to reduce the area thereof against which control chamber pressure is effective, and spring means which becomes operative simultaneously with said bellows to establish a force against said linkage in opposition to atmospheric pressure and greater than the force of said first mentioned spring means whereby to provide a net substantially constant force, so that said linkage will transmit to said pilot valve control forces such as to maintain a ratio between cabin and atmospheric pressures which decreases with increasing altitudes.

6. A pressure regulator for an aircraft cabin, comprising: a valve for regulating the flow of cabin air and thereby regulating the pressure within the cabin; a servomotor for operating the valve, said servomotor including a pressure responsive element and means cooperating with one side thereof to define a control chamber in which control pressure is maintained; means for controlling the pressure in said control chamber, including a pilot valve for bleeding excess pressure therefrom, and a combined differential and ratio control unit for said pilot valve including a pressure responsive member exposed on one side to atmospheric pressure and on its other side to control chamber pressure, connected to said pilot valve and adapted in a differential range of operation to operate said pilot valve in differential response to said atmospheric and control chamber pressures; and an evacuated pressure responsive device exteriorly subject to control chamber pressure and adapted to expand with decreasing control chamber pressure until at the beginning of a ratio control stage of operation, it makes contact with said pressure responsive member and thereupon becomes effective to decrease the area thereof which is responsive to control chamber pressure, thereby to cause said pressure responsive member to thereafter function in a manner to cause the ratio between cabin and atmospheric pressure to decrease with increasing altitudes.

7. A pressure regulator for an aircraft cabin, comprising: a valve for regulating the flow of cabin air and thereby regulating the pressure within the cabin; a servomotor for operating the valve, said servomotor including a pressure responsive element and means cooperating with one side thereof to define a control chamber in which control pressure is maintained; means for controlling the pressure in said control chamber, including a pilot valve for bleeding excess pressure therefrom, and a combined differential and ratio control unit for said pilot valve including a pressure responsive member exposed on one side to atmospheric pressure and on its other side to control chamber pressure, connected to said pilot valve and adapted in a differential range of operation to operate said pilot valve in differential response to said atmospheric and control chamber pressures; and an evacuated pressure responsive device exteriorly subject to control chamber pressure and adapted to expand with decreasing control chamber pressure until at the beginning of a ratio control stage of operation, it makes contact with said pressure responsive member and thereupon becomes effective to decrease the area thereof which is responsive to control chamber pressure, thereby to cause said pressure responsive member to thereafter function in a manner to cause the ratio between cabin and atmospheric pressure to remain substantially at or below a preestablished limit.

8. A pressure regulator for aircraft cabins, comprising: a valve for regulating the flow of cabin air so as to control the pressure within the cabin; a servomotor for operating the valve, said servomotor including a pressure responsive element cooperating with one side of said pressure responsive element to define a chamber in which cabin pressure may act against said pressure responsive element in valve opening direction, and means cooperating with the other side of said pressure responsive element to define a control chamber into which cabin air is permitted to bleed at a restricted rate; and means for controlling the pressure in said control chamber, including a pilot valve for bleeding off excess pressure therefrom and a combined differential and ratio control unit for operating said pilot valve, said unit including a diaphragm exposed to substantially atmospheric pressure on one side and to control chamber pressure on its other side, linkage connecting said diaphragm to said pilot valve so as to transmit atmospheric pressure in valve closing direction and control chamber pressure in valve opening direction, said diaphragm being operative in a differential stage of operation to control said pilot valve through differential response to the air pressures against its respective sides, and an evacuated bellows exteriorly subject to control chamber pressure adapted to gradually expand as control chamber pressure decreases, and operative at the beginning of a ratio control stage to establish contact with said linkage and thereby decrease the area of said diaphragm against which control chamber pressure is effective so as to cause said diaphragm to thereafter respond in a manner to substantially maintain a non-increasing ratio between cabin and atmospheric pressures.

9. A pressure regulator as defined in claim 8, including a spring operating against said linkage in valve closing direction and a spring within said evacuated bellows acting in the opposite direction and with a force greater than that of said first mentioned spring, whereby to provide a net substantially constant force against said linkage in the ratio control stage, such as to substantially maintain the ratio $$\frac{C-K}{A-K}=R'$$

where C represents cabin pressure, A represents atmospheric pressure, R' represents the ratio $$\frac{D}{D-B}$$

between the effective areas of the respective sides of said diaphragm, K represents said net substantially constant spring force divided by B, D represents the area of the diaphragm against which atmospheric pressure is effective, and B represents the effective area of the bellows.

10. In mechanism for controlling the pressure in an enclosure: a movable wall adapted to be subjected on one side to enclosure pressure; walls defining a control pressure chamber, the other side of said wall being subjected to said pressure in said chamber, said wall being movable in accordance with variations in the differential of pressure on opposite sides thereof; and control means for the pressure in said chamber, including a movable member responsive to variations in the differential of pressure between that in the control chamber and ambient atmosphere and means responsive to pressure in said chamber and becoming effective above the differential range of operation for changing the response of said movable member, for controlling the pressure in said chamber so as to cause the ratio between control chamber pressure and atmospheric pressure to decrease with increasing altitudes in a ratio control range of operation.

11. In mechanism for controlling the pressure in an enclosure: a movable wall adapted to be subjected on one side to only enclosure pressure; walls defining a control pressure chamber, the opposite side of said wall being subjected to the pressure in said chamber, said wall being responsive to variations in the differential of pressure on opposite sides thereof; and means, having a pressure sensitive member responsive differentially to atmospheric pressure and control chamber pressure, adapted to control the pressure in said control chamber and hence to control the pressure in said enclosure in such a manner as to cause the ratio between enclosure and atmospheric pressures to decrease with increasing altitudes in a ratio control stage of operation.

12. In mechanism for controlling the pressure in an aircraft cabin: a movable wall responsive to variations in the differential of pressure on opposite sides thereof, one side of said wall being subjected to only cabin pressure; walls defining a control pressure chamber, the opposite side of said movable wall being subjected to the pressure in said chamber; an inlet passage for said chamber; an outlet passage for said chamber; valve means controlling one of said passages; and differential pressure responsive means, subjected on opposite sides to atmospheric pressure and control pressure respectively, for controlling said valve, said differential pressure responsive means being so constructed and arranged as to control the operation of said valve means in a manner to maintain a ratio between cabin and atmospheric pressures, which, for all altitudes within a ratio-control range of operation, has a maximum value beyond which the human body cannot safely withstand explosive decompression.

13. In mechanism for controlling the pressure in an aircraft cabin: a differential pressure responsive element subjected on one side to cabin pressure; walls defining a control pressure chamber, the other side of said pressure responsive element being subjected to the pressure in said chamber; an inlet passage for said chamber; an outlet passage for said chamber; a valve controlling one of said passages; and a combined differential and ratio-control unit for controlling the operation of said valve, said unit including a pressure responsive element adapted, in a differential stage of operation, to respond to the differential between atmospheric and control chamber pressures exerted against its respective sides, and a device responsive to chamber pressure which becomes effective to change the response of the pressure responsive element of said unit whereby, in a ratio-control stage of operation, said unit will respond to atmospheric pressure exerted against one side and control chamber pressure effective against a reduced area of its other side.

14. In mechanism for controlling the pressure in an aircraft cabin: walls forming a control pressure chamber; a pressure sensitive element subjected on one side to cabin pressure and on the opposite side to control chamber pressure and movable in response to variations in the differential between said pressures; an inlet passage for said chamber; an outlet passage for said chamber; a valve controlling one of said passages; and a combined differential and ratio-control unit for controlling said valve, said unit including a pressure responsive member which in a differential stage of operation is responsive to the differential between atmospheric and control chamber pressures exerted against its respective sides, and a pressure responsive device absolutely responsive to control chamber pressure and adapted at the upper limit of the differential control range to become operative to change the response of said pressure responsive member to one which will substantially maintain a predetermined non-increasing ratio between control chamber pressure and atmospheric pressure.

15. In mechanism for controlling the pressure in an aircraft cabin: a pressure responsive element and walls cooperating with said pressure responsive element to define a control pressure chamber in which a control pressure is maintained, said element being adapted to be subjected on one side to cabin pressure and on the opposite side to control chamber pressure and responding to variations in the differential of said pressures; means for regulating said control pressure, including a pilot valve for bleeding excess pressure therefrom and control means for said pilot valve including a diaphragm exposed on one side to substantially atmospheric pressure and on its other side to control chamber pressure, and an evacuated bellows operative to reduce the effective pressure on the side of the diaphragm against which control chamber pressure is exerted, means for opposing a substantially constant force to the pressure of atmosphere against said diaphragm; and means for transmitting the net effect of said several pressures and said force to said pilot valve.

16. In mechanism for controlling the pressure in an enclosure: a movable wall adapted to be subjected on one side to only enclosure pressure; walls defining a control pressure chamber, the other side of said wall being subjected to said pressure in said chamber, said wall being movable in accordance with variations in the differential of pressure on opposite sides thereof; and means, including a movable member responsive to variations in the differential of pressure between that in the control chamber and ambient atmosphere for controlling the pressure in said chamber so as to cause the ratio between control chamber pressure and atmospheric pressure to decrease with increasing altitudes in a ratio control range of operation.

17. In mechanism for controlling the pressure in an aircraft cabin: a differential pressure responsive element subjected on one side to cabin pressure only; walls defining a control pressure chamber, the other side of said wall being subjected to the pressure in said chamber; an inlet passage for said chamber; an outlet passage for said chamber; a valve controlling one of said passages; and a combined differential and ratio-control unit for controlling the operation of said valve, said unit including a pressure responsive element adapted, in a differential stage of operation, to respond to the differential between atmospheric and control chamber pressures exerted against its respective sides, and in a ratio-control stage of operation to respond to atmospheric pressure exerted against one side and control chamber pressure effective against a reduced area of its other side.

18. In mechanism for controlling the pressure within an enclosure: walls defining a control pressure chamber; valve means for controlling the flow of air through an opening of said enclosure including a movable pressure sensitive control element subjected on one side to enclosure pressure and on the other side to control chamber pressure; pressure control means for said control chamber including a pressure responsive means responsive to the differential between control chamber pressure and the pressure exterior of said enclosure adapted to maintain the pressure in said chamber at a predetermined differential with respect to the pressure outside said enclosure; and means including a pressure responsive element responsive to the pressure within said control pressure chamber operable in a ratio range of operation above the differential range to vary the operation of said pressure control means for said control chamber whereby said pressure control means will maintain the pressure in said pressure chamber at a predetermined ratio with respect to the pressure outside the enclosure.

ROBERT A. ARTHUR.

REFERENCES CITED

The following references are of record in the file of this patent:

UNITED STATES PATENTS

| Number | Name | Date |
|---|---|---|
| 2,307,199 | Cooper | Jan. 5, 1943 |
| 2,342,220 | Price | Feb. 22, 1944 |
| 2,393,343 | Schroeder | Jan. 22, 1946 |
| 2,396,116 | Noxon | Mar. 5, 1946 |
| 2,399,326 | Crot | Apr. 30, 1946 |
| 2,402,681 | Schroeder | June 25, 1946 |
| 2,413,027 | Maxson | Dec. 24, 1946 |
| 2,419,707 | Cooper et al. | Apr. 29, 1947 |
| 2,450,881 | Cooper et al. | Oct. 12, 1948 |

FOREIGN PATENTS

| Number | Country | Date |
|---|---|---|
| 563,553 | Great Britain | Aug. 21, 1944 |